United States Patent
Williams et al.

(10) Patent No.: US 6,280,786 B1
(45) Date of Patent: Aug. 28, 2001

(54) PRODUCTION OF CORN DOGS

(75) Inventors: Ronald S. Williams; Ricky L. Goodell; James R. Anthony, all of Florence, AL (US)

(73) Assignee: Sara Lee Corporation, Winston-Salem, NC (US)

( * ) Notice: Subject to any disclaimer, the term of this patent is extended or adjusted under 35 U.S.C. 154(b) by 0 days.

(21) Appl. No.: 09/102,125

(22) Filed: Jun. 22, 1998

(51) Int. Cl.$^7$ .............................. A23B 5/00; A23L 10/02; A23L 1/31
(52) U.S. Cl. ........................ 426/305; 426/134; 426/140
(58) Field of Search .................................. 426/302, 305, 426/134, 140

(56) References Cited

U.S. PATENT DOCUMENTS 4,379,795 * 4/1983 Walser ................................. 426/304
4,749,579 * 6/1988 Haydock et al. ..................... 426/242

* cited by examiner

*Primary Examiner*—Anthony J. Weier
(74) *Attorney, Agent, or Firm*—Charles Y. Lackey, Esq.; Kilpatrick Stockton LLP

(57) ABSTRACT

An apparatus for preparing and cooking corn dogs (batter-coated wieners on a stick) which has a receiving bin, a loading apparatus, and a collecting and aligning system for arranging the wieners to receive sticks that form a handle for the finished product. The sticks are inserted into the wieners, and the stick impaled wieners are moved through a coating bin where batter is applied. They then progress to a fry tank containing hot grease where they are cooked. Preliminary heaters are positioned near the loading device and the collection and aligning system to bring the temperatures of the wieners up to around 80° Fahrenheit prior to insertion of the sticks, application of the batter, and introduction to the fryer. The method for utilizing the apparatus is included and enables the product to achieve faster cooking times and higher production by applying heat at at least two locations to the wieners as they move toward the fry tank for cooking.

6 Claims, 1 Drawing Sheet

PRODUCTION OF CORN DOGS

BACKGROUND OF THE INVENTION

1. Field of the Invention

This invention relates to an apparatus and a process for producing food products of the type generally known as corn dogs. It particularly concerns an apparatus and method that provides a reduction in production time and a corresponding increase in volume.

2. Description of the Prior Art

A corn dog is a wiener impaled upon a stick and coated with batter which is deep-fried to produce a crisp coating.

Initially, corn dogs were made by inserting sticks into wieners manually and clamping a plurality of sticks into a hand-operated clamp. A worker grasped the clamp and dipped the food articles in batter. Thereafter, the batter-coated wieners were immersed in hot grease. Patents relating to this early activity include U.S. Pat. No. 1,706,491 (Jenkins), U.S. Pat. No. 3,648,625 (Glass); and numerous others.

Production techniques became much more sophisticated with the development of machinery. There, the wieners are impaled by sticks driven through clasps and holes in a stick clamp and are then dipped into a batter by elevation of the coating bin. The articles are elevated by rotating or flipping them above the lip of the fry tank and immersed in hot grease within the fry tank, cooked, and then elevated by rotating or flipping them out of the fry tank. Thermostatically controlled heating elements suspended above the floor of the tank heat the grease. See U.S. Pat. No. 4,379,795 (Walser); U.S. Pat. No. 4,430,930 (Walser) and U.S. Pat. No. 4,842,181 (Walser). Thus, the production process became fully automated and enabled the consistent production of corn dogs not achievable in the manual processes.

While automation provided enormous gains in efficiency and production, the process is still inhibited by a relatively slow production time, primarily because fully cured wieners at a temperature from 28° to 32° Fahrenheit are introduced into a batter having a temperature from 35° to 40° Fahrenheit and are thereafter placed in a fryer to cook until a temperature of approximately 130° Fahrenheit is reached, Thus, the time to raise the temperature of the food product from around 30° to 130° is substantial and places a restriction on the output of the process even though it is carried out by a fully automated machine.

Attempts to expedite the process include raising the temperature of the fryer to accelerate the necessary cooking, however, a rapid increase in heat does sometimes adversely affect the texture of the final food product.

Thus, there is a need for speeding up the cooking process and achieving greater product volumes for a given time, and it is to these needs that the present invention is directed.

SUMMARY OF THE INVENTION

A part of the present invention includes a machine for preparing and cooking corn dogs, (batter-coated wieners on a stick) having a receiving bin, a loading apparatus, a collecting and aligning system and means for inserting sticks into the wieners to form bars. The bars of stick impaled wieners are moved through a coating bin for the application of batter, and a fry tank containing hot grease receives the coated wieners for cooking. Preliminary heaters are positioned adjacent the loading device and the collecting and aligning apparatus to bring the surface temperature of the wieners up to around 80° Fahrenheit prior to the insertion of sticks and the application of the batter. At this elevated temperature, it takes considerably less time to reach a cooking temperature of 130°, thereby resulting in much faster movement of the bars of batter coated wieners through the fry tank. Moreover, increasing the wiener surface temperature provides a better bond for the batter than would be the case if the entire wiener was heated to 80° Fahrenheit and minimizes the effect of internal temperature in handling the wieners.

The invention also includes the method for utilizing the apparatus described to achieve faster cooking times and higher production by applying heat at two different locations in the movement of the wieners toward the fry tank to elevate wiener temperature from 28° to 32° to approximately 80° Fahrenheit prior to the wieners receiving sticks, a coating of batter and being introduced to the fry tank.

From the foregoing, it can be seen that a primary objective of the present invention is to provide an apparatus for preparing deep-fried, coated food articles that has all of the advantages of prior art devices and methods and more and none of the disadvantages.

Another objective of the present invention is to provide an apparatus and process for accelerating the cooking times of corn dogs to achieve a significant increase in production.

A further objective of the present invention is to provide an apparatus that is simple in design and construction, easy to maintain, and economical to operate.

Thus, there has been outlined the more important features of the invention in order that the detailed description that follows may be better understood and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the arrangement of the components set forth in the following description or illustrated in the drawings. The invention is capable of other embodiments and of being practiced and carried out in various ways. It is also to be understood that the phraseology and terminology employed herein are for the purpose of description and should not be regarded as limiting in any respect. Those skilled in the art will appreciate that the concept upon which this disclosure is based may readily be utilized as a basis for designing other structures, methods and systems for carrying out the several purposes of this development.

It is important that the claims be regarded as including such equivalent processes and products resulting therefrom that do not depart from the spirit and scope of the present invention. The Application is neither intended to define the invention or the Application, which is measured by its claims, nor to limit its scope in any way. Thus, the objectives of the invention set forth above, along with the various features of novelty which characterize the invention, are noted with particularity in the claims annexed to and forming a part of this disclosure. For a better understanding of the invention, its operating advantages and the specific results obtained by its use, reference should be made to the following detailed specification taken in conjunction with the accompanying drawings wherein like characters of reference designate like parts throughout the several views.

DESCRIPTION OF THE PREFERRED EMBODIMENT

Figure 1:
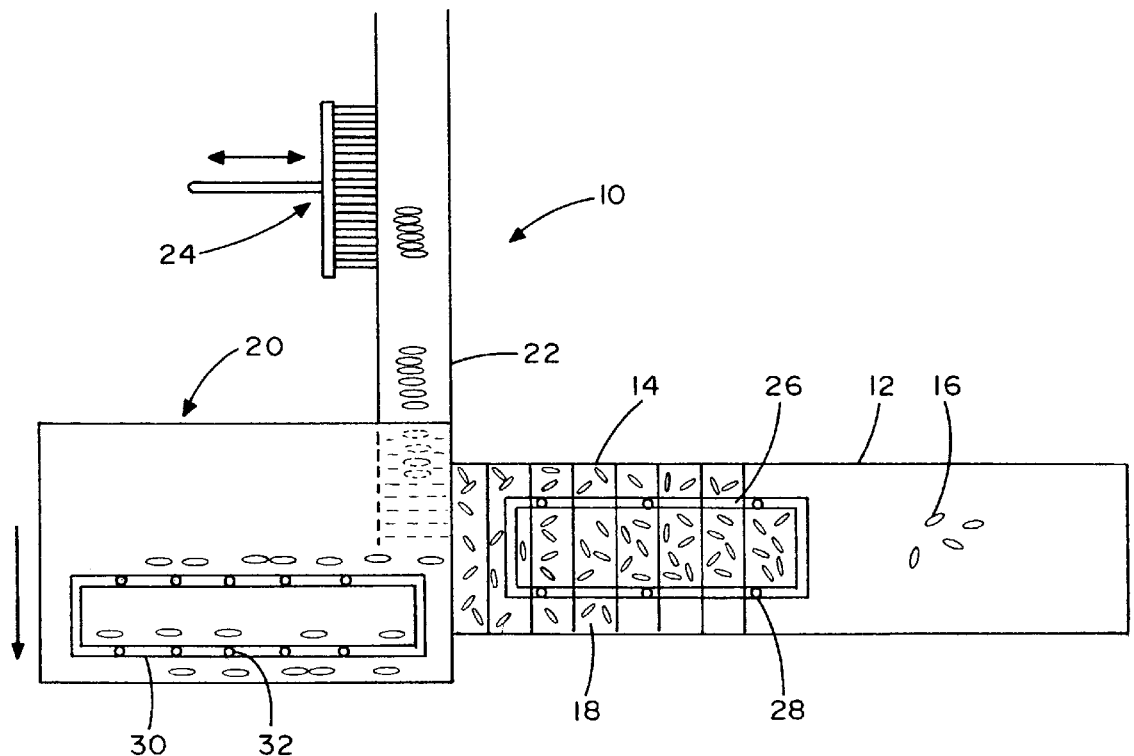
FIG. 1 is a plan schematic view of the apparatus for preparing and cooking corn dogs showing the wiener receiving bin, the wiener loader, the wiener collector and aligner, and the supplemental heaters utilized to raise the temperature of the wieners moving through the apparatus.
Figure 2:
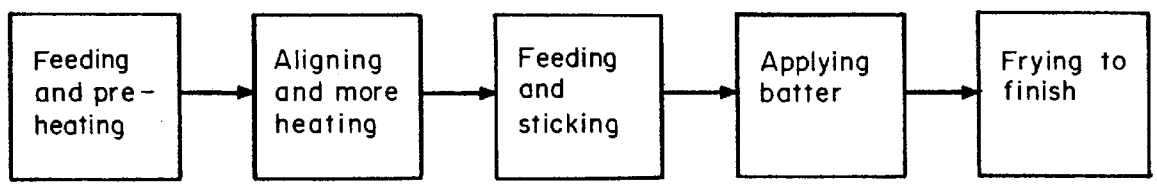
FIG. 2 is a block diagram detailing the process comprising a part of the present invention.

Referring to FIG. 1, an apparatus for loading wieners for alignment with and insertion in sticks is generally identified by reference numeral 10. A wiener receiving bin 12 is mounted to the apparatus 10 through a loading conveyer 14. Conveyor 14 extends into bin 12 and continuously engages accumulated wieners 16 so that they can be moved up the conveyor steps 18 and into a receiving and aligning unit 20. Wieners 16 are transferred to unit 20 and are aligned by its operation in a conventional manner so that the longitudinal axes of wieners 16 are parallel to each other as shown. A revolving drum (not shown) is encompassed within unit 20 to move aligned wieners downwardly (see arrow) for accumulation at the lower end of the drum and movement to conveyor 22 in a side-by-side relationship.

A stick inserting device, shown generally as 24, operates in a conventional manner to move reciprocally to insert a plurality of sticks into a plurality of aligned wieners 16 in a conventional manner. The stick impaled wieners 16 are then transferred in rows by an appropriate mechanism (not shown) to a batter application area where they are immersed in batter sequentially by rows and thereafter removed with a coating of consistently applied batter. The batter laden, stick impaled wieners are then moved to the fryer where they are fried to the desired finished condition. Conventional cooling and packaging steps are thereafter taken.

The apparatus described is generally similar to conventional apparatus for loading food for alignment with food sticks such as shown in U.S. Pat. Nos. 4,379,795; 4,430,930; and 4,842,181, the contents of which are incorporated herein by reference. The improvements to such devices include a first preheater 26 formed in one embodiment of the conduit having a plurality of nozzles 28 embodied therein. A water supply feeds the conduit and forces heated water through nozzles 28 to provide a pre-cooking mist against the surface of wieners 16 moving thereunder and thereby a first pre-determineed amount of heat.

A second pre-determined amount of heat is applied by a similar apparatus 30 having nozzles 32 positioned over the aligned wieners as they move with the rotation of the drum in the direction of the arrow. Thus, heaters 26 and 30, through the use in this preferred embodiment of water at high temperature, raise the temperature of the wieners from an initial 28° to 32° Fahrenheit up to approximately 80° Fahrenheit prior to receiving sticks and an application of batter. The batter covered wieners are then introduced to the fryer at a temperature of about 80° Fahrenheit as opposed to a temperature of from 35° to 45° Fahrenheit, thereby shortening significantly the cooking time in the fryer and enabling the movement of a significantly higher volume of finished product through the fryer than heretofore achievable. Since the rows of stick embedded and battered covered wieners are aligned on bars that pass through the fryer, the present apparatus and process enable the increase of movement through the fryer from about eight bars per minute up to about 14 bars per minute.

It is to be understood that the temperature increases discussed above are conveniently applied but that any increase in temperature in the preheaters will positively affect the cooking process and the efficiency thereof.

While the present embodiment contemplates the use of heated water or steam as a heating means, obviously any heating system including but not limited to oil heaters, coil heaters, infrared heaters, and otherwise might be interchangeably used in the pre-heater stage. Moreover, additional pre-heaters can be strategically placed at open locations along the food loading apparatus to increase the pre-heating activity and decrease the actual cooking time in the fryer.

Although the present invention has been described with respect to a specific preferred embodiment thereof, various changes and modifications may be suggested to one skilled in the art, and it is intended that the present invention encompass such changes and modifications as fall within the scope of the appended claims.

What is claimed is:

1. A method for preparing and cooking corn dogs comprising the steps of: directing a plurality of finished, formed and seasoned wieners in measured discrete quantities along a pre-determined path of travel;

applying a first pre-determined amount of heat to the untreated and unwashed wieners;

aligning the plurality of wieners to have parallel axes;

applying a second pre-determined amount of heat to the aligned wieners;

coating the wieners with batter;

inserting a stick in each of the wieners to form a handle;

cooking the stuck and coated wieners to form the finished corn dogs.

2. The method as claimed in claim 1 wherein the first pre-determined amount of heat will raise the temperature of the wieners to a range of from about 20° Fahrenheit to 30° Fahrenheit.

3. The method as claimed in claim 1 wherein the first and second pre-determined amounts of heat will raise the temperature of the wieners to a range of about 80° Fahrenheit to 100° Fahrenheit.

4. The method as claimed in claim 1 wherein the stuck and batter-coated corn dogs are prepared in rows and move through the cooking area within the range of from about 12 bars per minute to about 16 bars per minute.

5. The method as claimed in claim 2 wherein the stick-impaled corn dogs batter-coated wieners with inserted sticks are prepared in rows and moved through the cooking area.

6. The method as claimed in claim 3 wherein the batter-coated wieners with inserted sticks are prepared in rows and moved through the cooking area within the range of from about 12 bars per minute to about 16 bars per minute.

\* \* \* \* \*